March 4, 1969  C. I. JACOBSON  3,430,362
MATHEMATIC INSTRUCTION AID
Filed Aug. 24, 1966

Carol I. Jacobson
INVENTOR.

BY Clarence A. O'Brien
and Harvey B. Jacobson
Attorneys

March 4, 1969 C. I. JACOBSON 3,430,362

MATHEMATIC INSTRUCTION AID

Filed Aug. 24, 1966 Sheet 2 of 2

Carol I. Jacobson
INVENTOR.

BY Clarence A. O'Brien
and Harvey B. Jacobson
Attorneys

3,430,362
Patented Mar. 4, 1969

1

3,430,362
MATHEMATIC INSTRUCTION AID
Carol I. Jacobson, 100 Glendale Drive,
Tiffin, Ohio 44883
Filed Aug. 24, 1966, Ser. No. 574,727
U.S. Cl. 35—31    7 Claims
Int. Cl. G09b 23/02

ABSTRACT OF THE DISCLOSURE

An education device for teaching mathematics which has a board with holes therethrough and a series of apertured masks to overlie the board to expose selected holes therethrough. A series of pegs are also provided to be inserted in the exposed holes and cards with numbers thereon have holes therethrough to facilitate their being mounted on the exposed pegs, to illustrate the relationship between the numbers on the cards.

---

The present invention generally relates to an educational device and more specifically an instructional aid for use in aiding in the instruction of mathematics and particularly arithmetic including number concepts and relationships.

In present-day educational processes, one of the basic objectives in arithmetic is to teach understanding or an awareness of number relationships and patterns rather than memorization. Accordingly, it is an object of the present invention to provide an instruction aid for teaching number concepts, relationships and patterns which is sturdy in construction, effective for its particular functions, esthetically pleasing in appearance and relatively inexpensive to manufacture.

Another object of the present invention is to provide an instruction aid for mathematics or arithmetic in which the working area of the instruction aid is available for demonstration to the students with the area being labeled properly and sufficiently flexible in use to provide intellectual stimulation for the students thus leading the student to an insight into basic concepts in arithmetic and an understanding of processes and relationships of numbers.

A further object of the present invention is to provide an instruction aid for arithmetic which includes an apertured board having a symmetrical arrangement of holes therein together with pegs, masks and cards or tickets which can be mounted on the pegs together with indicia associated with the components for illustrating and demonstrating various basic concepts in arithmetic leading to an understanding of processes and relationships of numbers and other mathematical facts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

2

Figure 4:
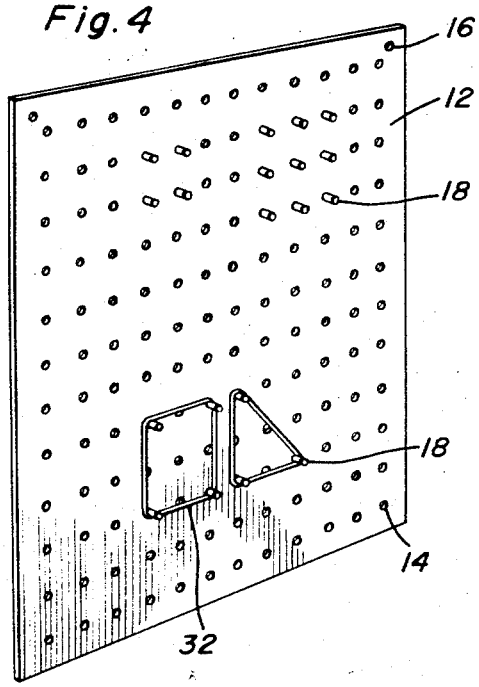
Figure 5:
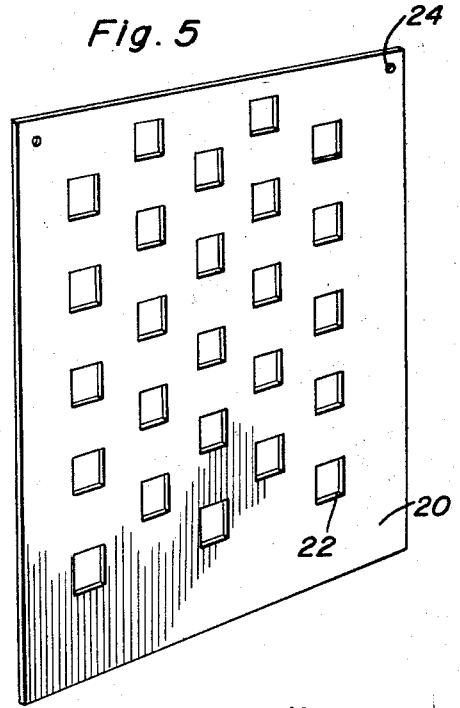
Figures 6, 7:
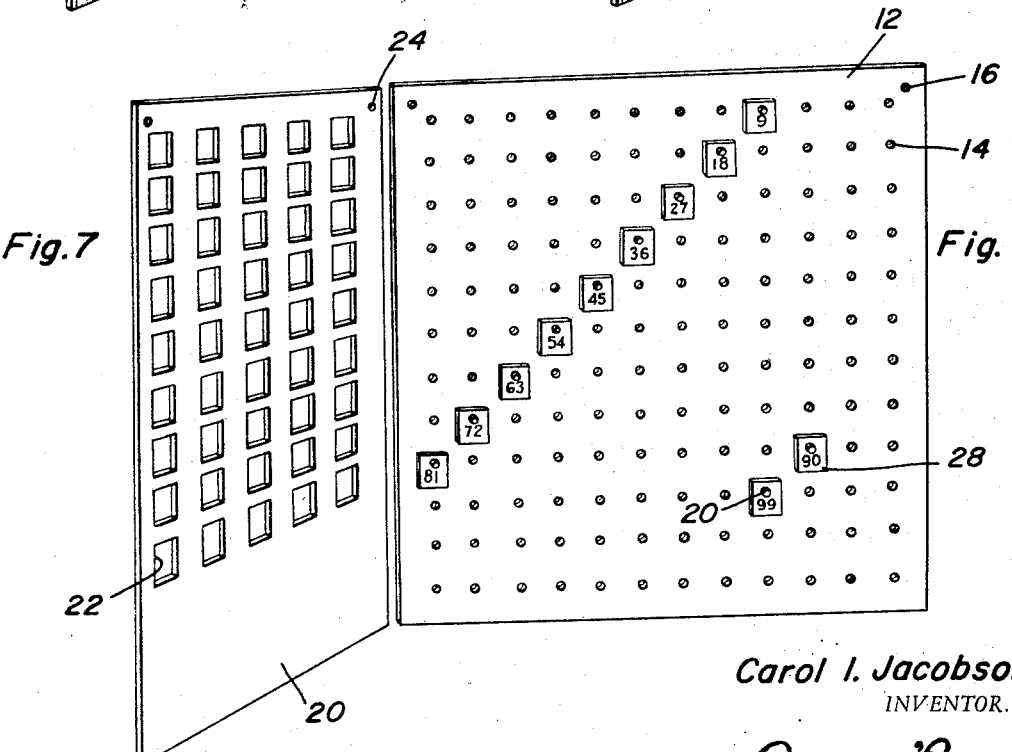

FIGURE 4 is a perspective view of the instruction aid employed in teaching certain relationships of numbers and geometric figures;

FIGURE 5 is a perspective view of one of the masks used in the instruction aid;

FIGURE 6 is a perspective view of the board being used to show the relationship between multiples of 9; and FIGURE 7 is a perspective view of another mask for use with the board when it is desired to show the relationship between multiples of 2.

Referring now specifically to the drawings, the numeral 10 generally designates the instruction aid of the present invention which includes a board or panel 12 having a plurality of holes or apertures 14 extending therethrough which are orientated symmetrically in a square pattern and in longitudinal and transverse rows with the board 12 being square and the pattern of the holes 14 being square. As illustrated, there are 12 rows of holes both longitudinally and laterally with the holes being equally spaced thus providing 144 holes in the board 12. The board 12 itself may be constructed of any suitable material such as wood, pressed fiberboard or the like and may conveniently be a commercially available board known as "peg board." At the upper corners of the board 12, a pair of mounting holes 16 may be provided by which the boards may be supported from projecting pegs, hooks or the like such as may normally be found in a school classroom or the like for supporting the board or panel 12 in generally a vertical position. Other means of support may be provided for the board 12 is desired.

A plurality of pegs 18 are provided which may be inserted into the holes 14 and will be frictionally held therein in a known manner such as by engagement of the periphery of the pegs 18 with the holes 14 so that the pegs 18 may be orientated in any desired pattern in relation to the board 12. If desired, the pegs may be provided with distinguishable color characteristics and may be of any suitable length but at least longer than the thickness of the board 12.

For overlying the board 12 and for use as a mask, a similar square panel or board 20 is provided having a plurality of square apertures 22 orientated therein for exposing certain of the square areas defined by the holes 14 in the board 12 when the boards 12 and 20 are disposed in overlying registered relationship. The mask or board 20 is also provided with corner holes 24 for registery with the corner holes 16 so that supporting pegs may be associated therewith or if the device is to be hand-held, a suitable fastener 26 may be employed for retaining the mask board 20 in registry with the board 12.

Figure 2:
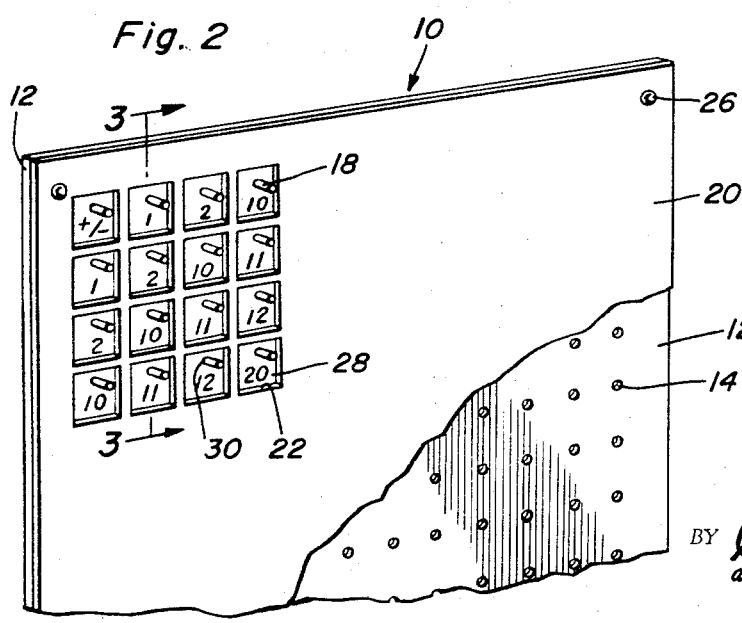
FIGURE 2 is a perspective view of the components of FIGURE 1 disposed in assembled relation.
Figure 3:
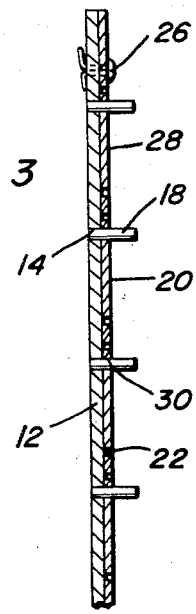
FIGURE 3 is a sectional view of the construction of FIGURE 2 taken substantially upon a plane passing along section line 3—3 of FIGURE 2.

A plurality of cards 28 are provided for positioning in the holes 22 and each card 28 has a hole or aperture 30 adjacent the upper edge thereof for positioning over one of the pegs 18 in the manner illustrated in FIGURES 2 and 3 so that the cards may be orientated in position in the holes 22 and supported on the pegs 18.

In the instruction aid of this invention, eleven masks 20 will be provided, with one mask each for base numbers 4, 6, 8, 10 and 11, one mask for odd numbers, one mask each for counting by 2, 3, 4, 5, and 9. The cards or tickets 28 will have indicia thereon for demonstration purposes and some of the tickets or cards may be blank for the student's use.

Figure 1:
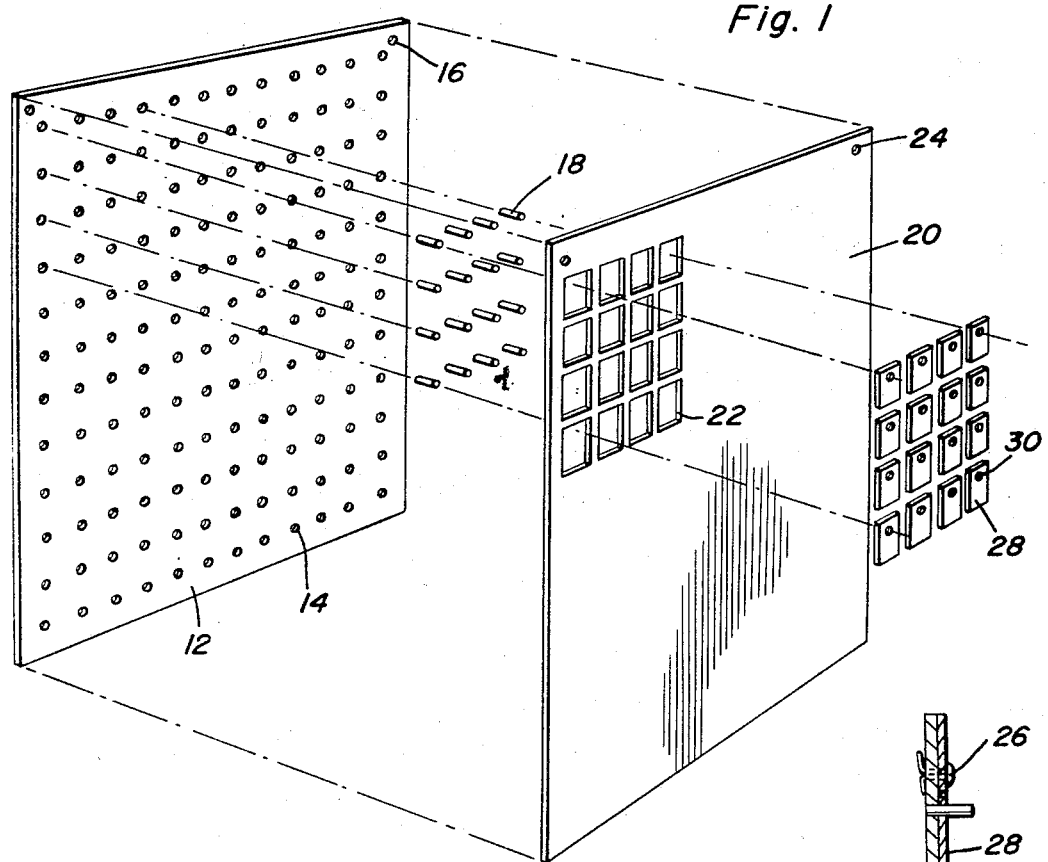
FIGURE 1 is a perspective view of the components of the instruction aid of the present invention illustrating an exploded arrangement of such components.

FIGURES 1–3, show the mask 20 in place to demonstrate a matrix in base number 3. In FIGURE 4, the pegs are arranged in the board to illustrate how squares of numbers and areas of geometric figures are demonstrated with a flexible member such as a rubberband or string being employed to indicate geometric figures are designated by numeral 32. FIGURE 5 illustrates a mask 20 having apertures 22 therein to show a pattern of 4's, wherein the upper left corner is the origin with the horizontal dimension being the abscissa and the vertical dimension being the ordinate, No. 1 would be the hidden space at the original and would send 1 through 12 along the abscissa, while the same progression from 1 through 12 would be along the hidden set of windows along the ordinate. Therefore the numbers appearing in the windows in FIGURE 5 in the topmost row would be 4 and 8. Similarly the numbers appearing in the other window would be the product of the numbers along the ordinate and abscissa relative to the window. FIGURE 6 discloses the board being orientated with pegs and cards or tickets to show a pattern of 9's. The mask in FIGURE 7 shows a pattern of 2's. The eleven masks will vary as indicated above to provide a matrix for each of base numbers 4, 6, 8, 10 and 11 and a mask for odd numbers and also one mask each for counting by 2, 3, 4, 5 and 9. Thus, the base number relationship may be demonstrated as well as a pattern relationship and geometrical figures may also be demonstrated and various mathematical computations may also be demonstrated. As is well known, numerals are used not only to tell how many or quantity but also to indicate position in an orderly arrangement of objects. Positional arithmetic is the simultaneous teaching of the achieving and recording of an "all" or total. In teaching the positional arithmetic the emphasis is on visual experience and the instruction aid of the present inventoin may be used very effectively to demonstrate how an "all" is achieved, first in base number 10 and then in other base numbers to insure the students understanding the counting and recording. The instruction aid is also valuable in visually demonstrating the place values of each position in that these can be demonstrated to the student after which the student may work independently to count and record in some base which has not been demonstrated thus testing his understanding of positionable arithmetic. Also, the inverse processes of an addition and substraction of whole numbers may be taught in base number 10 by using the mask indicating base number 11 which will allow the factors to be added or subtracted in the matrix to appear on the top horizontal row and the left vertical row of the mask. The demonstration of these processes may be worked in different bases that is, use the base number 8 mask to work a matrix in base number 7 use the base 6 mask to work in base 5, etc., and the matrices which are not demonstrable may, as mentioned above, be performed by the student working independently or in groups or in groups to determine the depth of understanding.

Also, the inverse processes of multiplicatoin and division may also be presented visually through the use of these masks. As these processes are presented along with the masks which mark off counting by 2, 3, 4, 5 and 9, the basic objective in the teaching of arithmetic is accomplished, that is, the discovery of patterns. As the patterns become apparent, the student can be motivated to discover the rules of divisibility. The patterns of 2, 5, and 9 are most easily found and 7 would be the most difficult and may present a challenge to a student or a project for a group of students.

Without any mask, the board and the pegs may be employed to illustrate the associative properties for addition and multiplication of whole numbers such as $$3+(5+9)=(3+5)+9 \text{ or } 3\times(5\times9)=(3\times5)\times9$$

Also, the cummutative properties of addition and multiplication of whole numbers may be shown as:

$$3+5=5+3$$
$$3\times5=5\times3$$

The distributive property of multiplication over addition may be represented as:

$$3\times(5+9)=(3\times5)+(3\times9)$$

The concept of the square number or squares of numbers can be demonstrated by inserting pegs in a number of holes both horizontally and vertically. For example, to demonstrate the square of 2 pegs are inserted in a square pattern of holes having two holes on each side thereof thus indicating four pegs and a corresponding demonstration can be made for other numbers within the limits of the size of the board. Ratios may be represented through the use of the pegs. For example, the relationship of two pegs to four pegs, three pegs to six pegs, two pegs to six pegs or three pegs to twelve pegs may be easily represented. In the field of geometry, it can be demonstrated with the use of rubberbands around certain pegs the representation of a square and how to measure the perimeter and area. When a square is divided into two triangles by using two rubber bands, the student can be motivated to discover how to measure its area and truly understand the formula for determining the area of a triangle because the student can see how it was arrived at and, in effect, discover it for himself.

Thus, by using the instruction aid of the present invention, it will demonstrate re-grouping, help the student to visualize quantity, promote understanding of processes and strengthen the ability of manipulate numbers mentally. From the teachers standpoint, the device is helpful in establishing related facts and processes and is useful in review work and provides means for testing students for understanding.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An instruction aid for teaching number concepts, relations and patterns comprising: a board having a symmetrically arranged group of holes defining a square pattern with an equal number of horizontal and vertical rows being provided with the holes being equally spaced from each other, a plurality of masks with apertures therethrough for positioning in overlying relation to the board for exposing certain holes therethrough, a plurality of pegs for insertion in the exposed holes in the board, and a plurality of cards having apertures therein for positioning on the pegs.

2. The structures as defined in claim 1 together with means for retaining the mask registered and aligned with the board.

3. The staructure as defined in claim 1 wherein said cards have indicia thereon for indicating certain relationships, values and the like.

4. The structures as defined in claim 1 wherein the masks have apertures therein of a dimension to receive the cards therethrough.

5. The structure as defined in claim 4 wherein said apertures in the mask are arranged to enable counting by numbers by revealing certain pegs.

6. The structure as defined in claim 5 wherein said apertures in the mask are arranged to indicate matrices of certain base numbers.

7. An instructional aid comprising: a board with spaced holes therethrough, a plurality of masks with apertures therethrough to overlie said board and expose certain holes, a plurality of pegs for insertion in said exposed holes, and a plurality of cards having apertures adapted to be positioned on the pegs inserted in the holes exposed by the mask.

References Cited

UNITED STATES PATENTS

| | | | |
|---|---|---|---|
| 3,374,558 | 3/1968 | Smith | 35—31.4 |
| 1,400,887 | 12/1921 | Liebman | 35—31.4 |
| 1,490,858 | 4/1924 | Seegers | 35—31.6 |
| 3,235,975 | 2/1966 | Pierson | 35—30 |
| 3,339,295 | 9/1967 | Wanvig | 35—31.4 |

FOREIGN PATENTS 104,392  3/1917  Great Britain.

WILLIAM H. GREIB, *Primary Examiner.*